United States Patent
Qualls

[19]

[11] Patent Number: 6,113,497
[45] Date of Patent: Sep. 5, 2000

[54] ELASTOMER ENGINE COUPLER FOR DRIVELINES

[76] Inventor: W. Hershel Qualls, 1834 Donner, Clovis, Calif. 93611

[21] Appl. No.: 09/143,997

[22] Filed: Aug. 31, 1998

[51] Int. Cl.[7] .................................................. F16D 3/78
[52] U.S. Cl. .................................. 464/88; 464/92; 464/87
[58] Field of Search .................................. 464/87, 88, 92, 464/93

[56] References Cited

U.S. PATENT DOCUMENTS

| | | | |
|---|---|---|---|
| 1,954,937 | 4/1934 | Little, Jr. ..................................... | 74/574 |
| 2,742,769 | 4/1956 | Gleeson et al. ............................ | 464/92 |
| 2,873,010 | 2/1959 | Alma ......................................... | 464/92 |
| 3,988,907 | 11/1976 | Bohm . | |
| 3,995,513 | 12/1976 | Amdall et al. ............................. | 74/574 |
| 4,351,167 | 9/1982 | Hanke . | |
| 4,604,908 | 8/1986 | Dolan ...................................... | 74/15.88 |
| 4,634,391 | 1/1987 | Entringer . | |
| 4,813,909 | 3/1989 | Eckel . | |
| 5,341,780 | 8/1994 | Rau et al. ................................. | 74/574 |

*Primary Examiner*—Lynne H. Browne
*Assistant Examiner*—Kenneth Thompson

[57] ABSTRACT

A coupling assembly for coupling the flywheel of an internal combustion engine to a U-joint based driveline. The coupling member absorbs damaging torque and vibrational energy while maintaining driveline alignment and providing safety through securing of frontplate (1) to alignment safety bearing (14) to backplate (11) while transmitting rotational drive force.

3 Claims, 2 Drawing Sheets

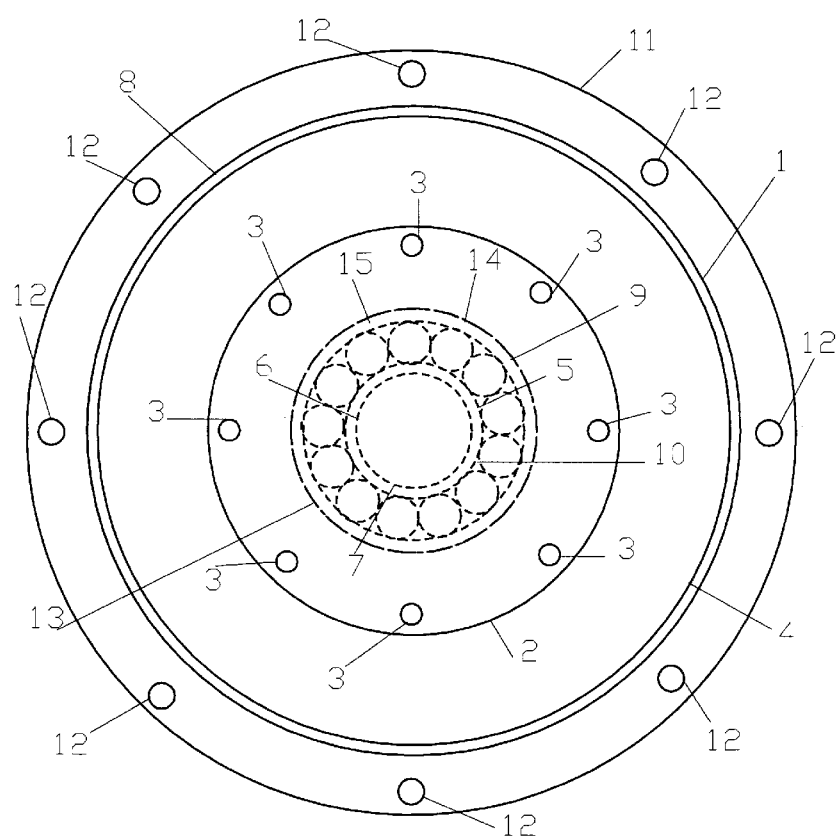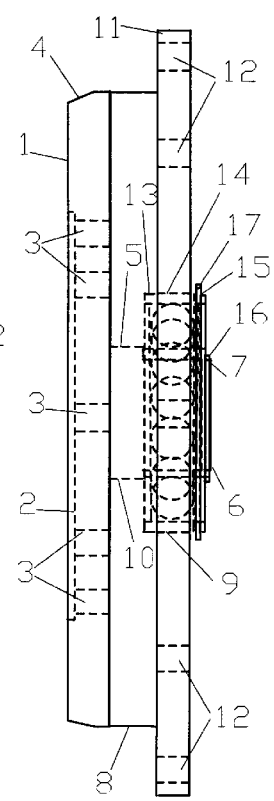
Fig 1                    Fig 2

ELASTOMER ENGINE COUPLER FOR DRIVELINES

BACKGROUND

1. Field of Invention

This invention relates to engine couplers, specifically couplers used to attach a engine flywheel to a U-joint type driveline.

2. Discussion of Prior Art

Engine driven devices were historically attached to an engine with a solid metal adapter. These solid adapters resulted in the transmission of damaging forces to the engine and attached driven device. This problem promoted various efforts to isolate and/or absorb the forces before they transmitted to the equipment. Inventors created several types of coupling devices designed to absorb these forces with an elastic component built within the coupling device. U.S. Pat. No. 3,988,907 (1976) discloses a rubber & fabric combination which claims to transmit torque while controlling unwanted forces, however this device is limited to the strength of the fabric and the limitations of the maximum diameter which would be required to manage high torque engines. Additionally this device requires the use of additional components to adapt to the desired object and therefore results in a greater number of components for potential failure while adding additional weight. U.S. Pat. No. 4,813,909 (1989) claims to elastically couple two rotating devices but is very complex in design and results in a excessively expensive manufacturing process and is only effective for the specific rotating device for which it is designed. U.S. Pat. No. 4,351,167 (1982) uses the technology of the old metal spring type couplers and substitutes rubber and fluid for the metal springs. This design is to complex and has limited applications based on the design and limited force handling capability. U.S. Pat. No. 4,634,391 (1987) manages the torsional forces from the engine, but has limited application specific to a stern drive shaft. Additionally the encapsulated elastomeric element will fail to convert the drive torque to the stern drive with the application of a high torque output engine and will be permanently damaged as a result of this failure. Additional devices in the industry reveal no designs capable of handling high torque applications without the use of multiple massive adapters at a very high manufacturing cost even in the most standard of applications. Additionally, these devices using multiple adapters result in undesired excessive reciprocating mass.

OBJECTS AND ADVANTAGES

Accordingly, besides the advantages and objects of the drive couplers described above, several objects and advantages of the present invention are:

a) To provide a coupler with limited complexity through the reduction of parts and components.

b) To provide a coupler capable of handling all torque applications while maintaining an elastomeric energy absorbing capacity.

c) To provide a coupler that can maintain alignment in all applications.

d) To provide a coupler with minimal reciprocating mass through a light weight design.

e) To provide a coupler capable of maintaining alignment and connectivity between engine and driven device to provide safety to the user in the event of failure of elastomeric element.

f) To provide a coupler capable of continuous rotation in the event of failure of elastomeric element to provide safety to the user.

g) To provide a coupler compatible with all SAE and automotive engine flywheels and standard driveline yokes.

Further objects and advantages are to provide a coupler that is easily installed in all applicable flywheel to driveline applications which can be manufactured at a reasonable cost and be maintained by the end user in the event of bearing wear.

DRAWING FIGS.

FIG. 1 is a front view of the invention, the internal parts shown in phantom lines.

FIG. 2 is a side view of the invention, the internal parts shown in phantom lines.

Figure 3:
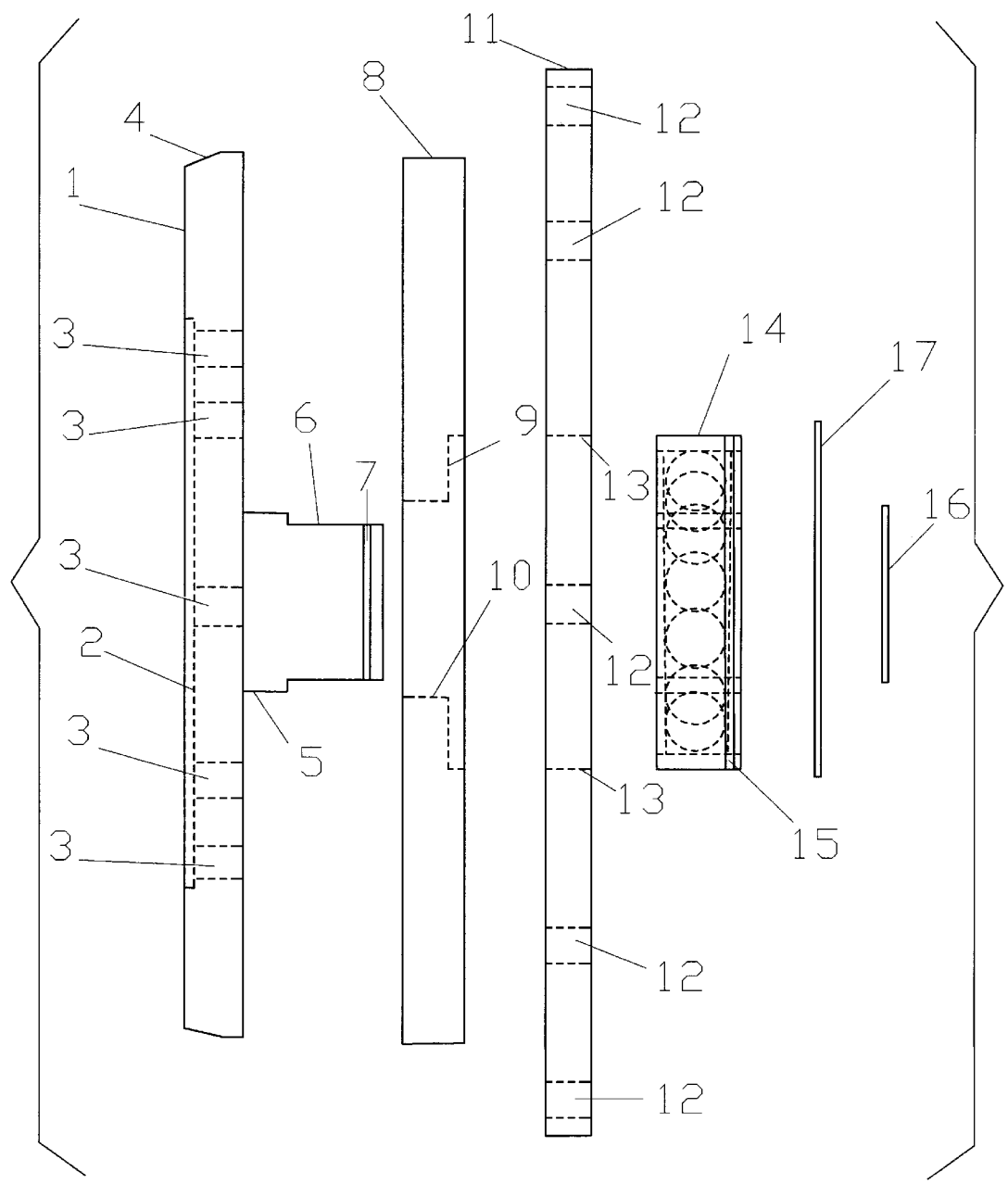
FIG. 3 is an exploded side view of the invention, the internal parts shown in phantom lines.

1) Front plate circular metal driveline yoke adapter.
2) Machined register to accept driveline yoke.
3) Threaded holes to bolt on driveline yoke.
4) Machined taper to provide easy die closure.
5) Machined alignment shaft.
6) Machined tolerance fit to accept press fit bearing.
7) Machined small snap ring groove.
8) Elastomeric element.
9) Molded cavity to accept outer diameter of bearing.
10) Cavity resulting from the shaft penetration during molding process.
11) Back plate circular metal flywheel adapter.
12) Flywheel attachment bolt holes.
13) Machined hole to accept tolerance fit bearing.
14) Alignment safety bearing.
15) Machined large snap ring groove.
16) Small snap ring.
17) Large snap ring.

SUMMARY

A elastomer engine coupler for drivelines used in connecting the flywheel of an engine to a driveline, that will absorb damaging torque vibrations while maintaining a low reciprocating mass and providing ongoing connectivity and alignment even in the event of total driven equipment failure resulting in elastomeric element failure.

DESCRIPTION

A circular metal backplate (11) is machined to applicable SAE or automotive engine flywheel mounting specifications which includes the outside diameter as well as the appropriately spaced mounting holes (12) and additionally a hole is machined (13) in the center of the backplate (11) to accommodate a tolerance fit alignment safety bearing (14). The backplate (11) is bonded to a elastomeric element (8) having rubber like properties. The elastomeric element (8) is bonded to a frontplate circular metal driveline yoke adapter (1). The frontplate circular metal driveline yoke adapter (1) is machined with a hole in the center to accept the installation of a machined alignment shaft (5) with additional machining to accommodate the applicable driveline yoke which includes a machined register (2) and appropriately spaced and threaded holes (3) for mounting driveline yoke. The machined alignment shaft (5) is machined to a tolerance fit surface (6) to receive alignment safety bearing (14) along with a machined small snap ring groove (7) at the end of the shaft. The machined alignment shaft (5) is welded into the machined hole in the center of the frontplate (1). The frontplate (1) with machined alignment shaft (5) welded into machined hole is bonded to elastomeric element (8) resulting in machined alignment shaft (5) penetrating machined hole (13) in center of backplate (11). The machined alignment shaft (5) penetrating the backplate (11) allows for the installation of the tolerance fit alignment safety bearing (14). The alignment safety bearing (14) contains a machined large snap ring groove (15). The alignment safety bearing (14) is pressed onto the machined tolerance fit surface (6) of the machined alignment shaft (5) which results in the bearing (14) being pressed into the machined hole (13) in the backplate (11) and upon full installation of the safety alignment bearing (14) will penetrate and fill molded cavity (9). Once alignment safety bearing (14) installation is complete a small snap ring (16) is installed into the machined small snap ring groove (7) of the penetrating end of the machined alignment shaft (5) and a large snap ring (17) is installed into the large snap ring groove (16) of the alignment safety bearing (14). The bonding process of the backplate (11) and the frontplate (1) to the elastomeric element (8) is performed through a molding process. The molding process uses a bonding agent applied to both the backplate (11) and the frontplate (1). The backplate (11) is secured to the bottom of the mold and the elastomeric compound is placed onto the backplate (11) followed by the placement of the frontplate (1), with machined alignment shaft (5) welded in place. The mold is closed and compressed along with applied heat to result in bonding of elastomeric element (8) to frontplate (1) and backplate (11). Upon completion of molding process the frontplate (1) with machined alignment shaft (5) welded in place, the elastomeric element (8), and the backplate (11) form a permanent singular piece.

Operation

The operation of the Elastomer Engine Couplers for Drivelines is accomplished upon installation within a needed engine to driveline connection. The connection is accomplished beginning with the attachment of the backplate (11) to a flywheel of an internal combustion engine by inserting bolts though the flywheel attachment holes (12). With the entire coupler now suspended from a flywheel a driveline yoke is installed to the frontplate (1) by inserting bolts through the yoke and threading into the threaded holes (3). Upon completion of the above steps the coupler is ready for attachment to a driveline which is ultimately attached to a driven device. The driven device will now be driven by the engine with the coupler providing the designed torque and vibration absorption capabilities within the elastomeric element (8). The driveline alignment and support are provided through the installed relationship between alignment shaft (5) and the machined tolerance fit surface (6) with alignment safety bearing (14) pressed into place and with the small snap ring (16) installed into small snap ring groove (7) and large snap ring (17) installed into large snap ring groove (15). The small snap ring (16) is installed into the small snap ring groove (7) to assure under all conditions that the frontplate (1) can not be separated from the alignment safety bearing (14) while the installed large snap ring (17) installed into the large snap ring groove (15) assures the bearing can not be pulled through the backplate (11). The securing of the frontplate (1) to the alignment safety bearing (14) and the securing of alignment safety bearing (14) to backplate (11) assures that in the event of failure of either coupled member resulting in the destruction of the elastomeric element (8) or the bond to the frontplate (1) or backplate (11), separation of coupler plates will not occur and continued rotation of the coupled engine can be maintained until proper engine shutdown can occur.

Conclusion, Ramification, Scope

Accordingly, the reader will see that the Elastomer Engine Coupler for Drivelines can provide an effective means of absorbing equipment damaging torque and torsional vibration while maintaining safety and simplicity. Furthermore the Elastomer Engine Coupler for Drivelines has the additional advantages in that:

The lightweight design minimizes unnecessary reciprocating mass.

It is applicable to all size flywheels based on the unlimited sizing of backplate (11).

It is adaptable to all of driveline applications based on the ability to machine the machined register (12) and threaded holes (3) of frontplate (1) to accept all driveline yokes.

It can be rebuilt through the simple replacement of the alignment safety bearing (14) in the event of wear.

Although the description above contains many specifications, these should not be construed as limiting the scope of the invention but merely providing illustrations of some presently preferred embodiments of this invention. For example, the backplate may be formed in a shape other than circular to meet the needs of other applications.

Thus the scope of the invention should be determined by the appended claims and their legal equivalent, rather than by the examples given.

What is claimed is:

1. A coupling for connecting a drive shaft to the flywheel of an engine comprising:

a first metallic disc having a large central opening for receiving a bearing structure and a plurality of smaller openings spaced apart just inside the outer perimeter of said disc for attaching said disc to said flywheel;

a disc-shaped annular elastomeric member having two sides, the first side being chemically bonded to said first metallic disc, said elastomeric member having a diameter smaller than said first metallic disc such that said peripheral attachment openings are not covered by said elastomeric member, said elastomeric member also having a central bore with an internal annular shoulder such that said bore has a larger diameter on the side adjacent to said first disc which corresponds to the central opening in said disc, said bore having a smaller diameter on the opposite side;

a second metallic disc having the same approximate diameter as said elastomeric member and being chemically bonded to the second side thereof, said second disc having a central shaft attached thereto which extends through the bore of said elastomeric member, said shaft having an annular shoulder which divides said shaft into two segments such that the diameter of the first segment immediately adjacent to said second disc is the same as the smaller diameter of said bore, the diameter of the remaining segment corresponding to the inside diameter of said bearing structure, the shoulders of said shaft and said bore corresponding to each other such that said first shaft segment fits flush against the shoulder of said bore; and an annular bearing structure inserted around said remaining shaft segment and inside the large central opening of said first disc such that said bearing structure abuts against the shoulder on the bore on said elastomeric member.

2. The coupling of claim 1 wherein the bearing structure is sized such that its outside edge is exposed following installation, a machined groove is provided on said outside edge, and a corresponding snap ring is provided for installation into said groove to secure said bearing to said first disc; and wherein said shaft is sized such that it protrudes out from said bearing structure following installation thereof, a machined groove is provided on the exposed end of said shaft, and a corresponding snap ring is provided for installation into said groove to secure said shaft to said bearing.

3. The coupling of claim 2 wherein a central recessed register and a plurality of threaded attachment bores are provided on said second disc on the side opposite from said elastomeric member, for receiving one end of said drive shaft.

* * * * *